Figure 3:
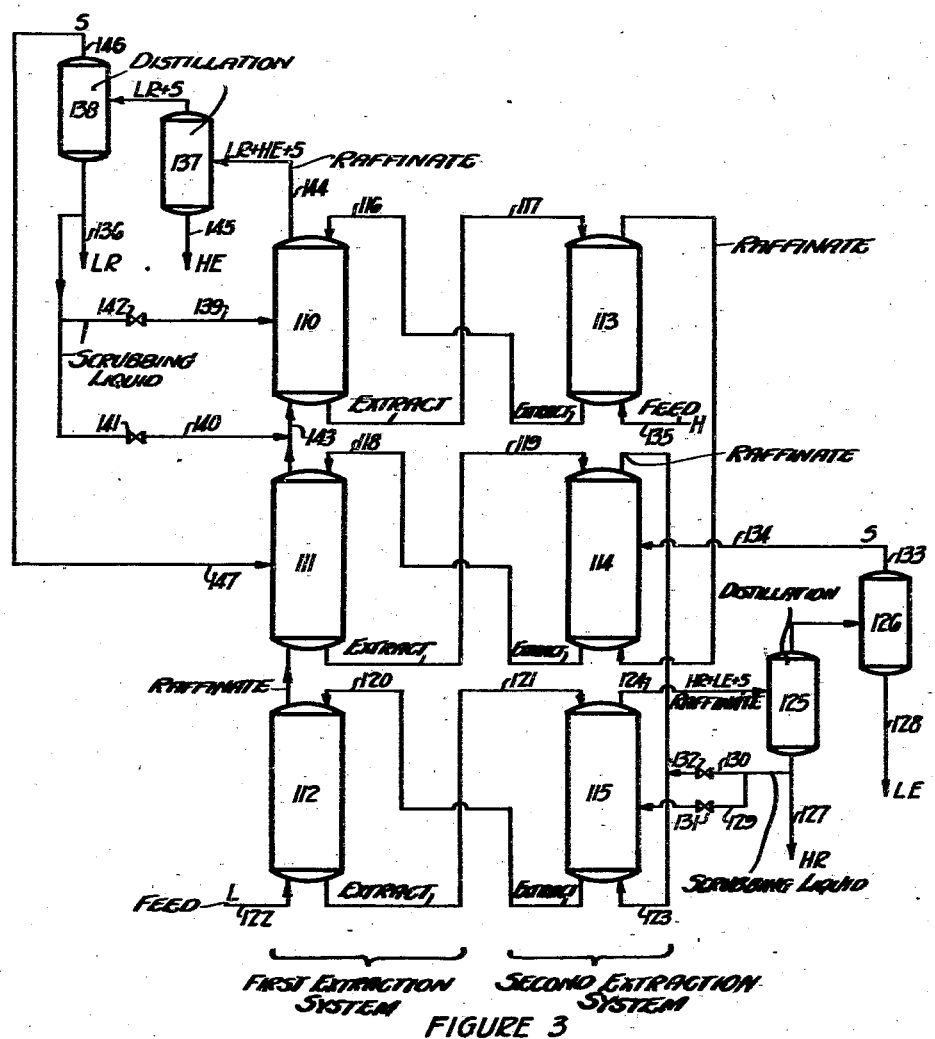

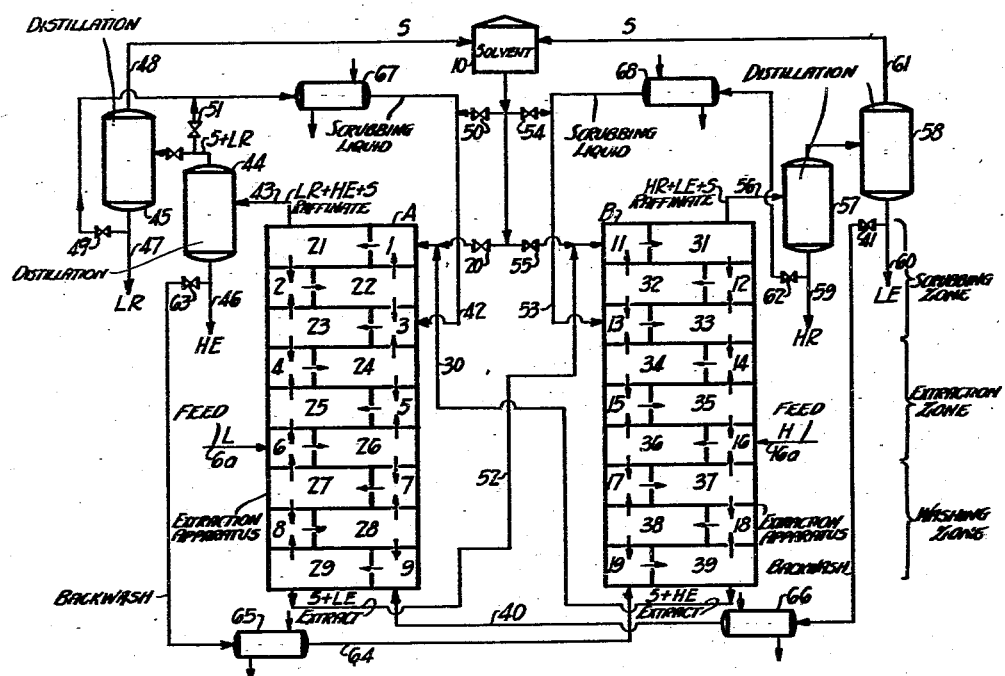

Patented May 21, 1940

2,201,550

UNITED STATES PATENT OFFICE 2,201,550

PROCESS FOR THE SOLVENT EXTRACTION OF LIQUID MIXTURES

Willem J. D. van Dijck, The Hague, and Albert Schaafsma, Amsterdam, Netherlands, assignors to Shell Development Company, San Francisco, Calif., a corporation of Delaware Application January 15, 1937, Serial No. 120,736
In the Netherlands January 16, 1936

16 Claims. (Cl. 196—13)

This invention relates to an improved process for the extraction of a plurality of liquid mixtures with a common selective solvent or mixture of solvents, and is an improvement of the process described in the Van Dijck application Serial No. 30,495 filed July 9,1935.

It is an object of the present invention to provide a process for extracting two or more liquid mixtures with a selective solvent in a manner to obviate the necessity of distilling large quantities of selective solvent normally employed in extraction processes. It is a further object to improve the separation effected when two or more liquid mixtures are separated into their components by extracting them with the same selective solvent without distilling all of the several extract phases produced in the successive extractions of the different mixtures to recover the solvent in a pure state by recycling a portion of the raffinate component into the extraction apparatus. Other objects of our invention will be apparent from the following specification.

In the above Van Dijck application a process was described for extracting two or more liquid mixtures with qualitatively different components or groups of components in which each liquid mixture or certain or all components thereof were separable from each of the other liquid mixtures or from components thereof. According to that process a first liquid mixture is extracted with a selective solvent (which may contain dissolved components from a prior extraction) to produce an extract phase and a raffinate phase, which are separated and the extract phase is employed as the extracting agent for the extraction of a second liquid mixture, preferably in a countercurrent extraction operation. It was also proposed to use the extract phase produced in the second extraction as the extracting agent for the first liquid mixture.

It was, likewise, described in the above-mentioned application that a part of the raffinate and/or extract components of any liquid mixture obtained in the process may be returned to that stage of the process in which said liquid mixture is being extracted. With reference to the point of introduction of said obtained raffinate components, the said application contemplates the introduction of the recycled raffinate component into the apparatus together with the initial mixture of which the raffinate in question forms a part.

In accordance with the present invention it was found that materially improved results are obtained by introducing the raffinate components to be recycled into the extraction apparatus at a point situated between the inlet of the mixture to be extracted and the inlet of the extracting agent, the extraction apparatus being operated in a countercurrent manner so as to provide one or more actual or virtual extraction stages at said point and each of said two inlets. Preferably the raffinate components are introduced at such a distance from the point of introduction of the mixture to be extracted that the latter at the point of introduction of the raffinate components for the greater part has been stripped of its extract components.

The process according to the invention is, therefore, characterized by the solvent obtained on extraction and laden with extract being used as extracting agent for the next liquid mixture and by part of the obtained raffinate components of one or more liquid mixtures being introduced into the part of the apparatus in which the said liquid mixture is being extracted at a place situated between the inlet of the mixture to be split up and that of the extracting agent.

The above-mentioned place of entrance of the extracting agent to be employed, moreover, preferably corresponds approximately to the place at which the raffinate component(s) mixed with the extract components of one or more of the other mixtures to be split up flow(s) off from the extraction apparatus.

The part of the extraction apparatus situated between the inlet of the recycled raffinate component(s) and the inlet of the extracting agent to be employed will be referred to as scrubbing zone in the present specification. The part of the extraction apparatus situated between the inlet of the recycled raffinate components and the inlet of the mixture to be split up will be referred to as extraction zone.

In some extraction processes there may also be distinguished a washing zone. In fact, in those cases where the extract phase, i. e., the extract dissolved in solvent flowing off from the extraction zone into another zone (washing zone) is treated in countercurrent either with a portion of the extract phase wholly or partly freed of solvent (which may be produced, for example, by chilling the said extract phase present in the washing zone, either within or outside said washing zone, or by distilling all or part of the solvent from the extract phase flowing off from the extraction zone or the washing zone, or by recovery from the raffinate phase obtained in a subsequent stage of the process), or with a second solvent which is miscible to a limited extent with the solvent employed for the extraction, the name "washing" is applied to this treatment, the apparatus in which the said washing is carried out being referred to as "washing zone."

From the above it will be clear that the apparatus in which a liquid mixture is extracted according to the process of the present invention should consist of at least a scrubbing zone and an extraction zone.

In the present specification, initial liquid mixtures are designated by capital letters, e. g., L and H. The component or components which are preferentially dissolved in the selective solvent S (i. e., the extracts) are represented by the letter E, with or without accents, preceded by the letter indicating the initial mixture originally containing the same; thus LE represents an extract from L, HE' an extract from H. The insoluble parts (i. e., the raffinates) are represented by the letter R after the letter indicating the liquid mixture in which this insoluble part originally occurred; thus LR is the insoluble or raffinate of L.

In the process according to the present invention a liquid consisting of a selective solvent S and, for example, an extract LE, obtained from the liquid mixture L, is employed as the extracting agent for the extraction of a subsequent mixture, e. g., H, for the purpose of selectively removing HE from H.

As mentioned above, the removal of the component LE is effected by an extraction (called scrubbing) such as with a liquid substantially consisting of HR. The presence of an excess of the component HR has proved undesirable in the part of the extraction apparatus (extraction zone) in which the component or group of components HE is washed out by the solvent S. In fact, the presence of an excess of HR leads to a great reduction of the concentration of HE in that portion of the extraction apparatus near the point of the introduction of the mixture H, the extraction thus becoming difficult. Hence the raffinate component should be introduced at a place where the phase poor in solvent is already rich in HR.

As a result of the scrubbing of the solvent laden with extract (LE) with the aid of the above-mentioned phase rich in HR the concentration of the dissolved extract (LE) is reduced, whilst as a result of the subsequent extraction of the initial mixture H the content of extract components (HE) in the solvent is again increased. Now the raffinate components obtained are fed into the system at the place where the concentration of dissolved components in the circulating solvent used is lowest.

The process according to the invention may be applied both with simple and with more complicated methods, according to which it is known to split up a liquid mixture into a number of components with the aid of one or more selective solvents.

The process can be applied in an apparatus consisting only of an extraction zone and a scrubbing zone. In order to split up a specified liquid mixture, e. g., L, use may be made of a single selective solvent (S) or of a mixture of several entirely miscible solvents. As solvents there may also be employed two liquids or liquid mixtures (S and P), which are miscible to a limited extent and are conducted in countercurrent with each other. These two liquids, therefore, when contacted with each other, constitute two phases. They should satisfy the requirement that the components of the mixture (L) to be split up or of the mixtures to be split up, e. g. L and H, are distributed in different proportions over the two said phases S and P.

If the extraction is carried out according to the latter process, either the solvent S or the solvent P may be used or have been used for the extraction of another liquid mixture.

The process according to the invention may also be carried out in one or more apparatus consisting of a scrubbing + an extraction + a washing zone. The mixture to be split up is then introduced into the apparatus described on the boundary between the extraction and the washing zone.

As washing agent in the washing zone there may be used: (1) a part of the most soluble components of the mixture, e. g. of the extract obtained, (2) a liquid P which is immiscible or miscible to a limited extent only with the selective solvent (S) employed in the extraction, (3) a mixture of the two liquids mentioned sub (1) and (2).

A number of the extraction methods herein described, which may be applied to the process according to the present invention, are described in the U. S. Patents Nos. 2,023,109, 2,081,720 and 2,071,719, and in the French Patent specification No. 45,965, addition to No. 755,291.

The process according to the invention may also be applied with multiple-connected systems. With this embodiment the solvent employed flows in a cycle; for example, after having been used with the first and then with the second mixture to be split up, it is employed again in the extraction of the first liquid mixture.

The multiple-connected systems (which have also been described already with reference to Fig. 4 of the above-mentioned application Serial No. 30,495) are characterized by employing not one, but several solvent cycles at the same time when splitting up two or more liquid mixtures, e. g., L and H. In this case it is immaterial whether use is made of mixers and settlers, or of columns, or of mixers and centrifuges.

If the apparatus consisting, for example, of a scrubbing zone + an extraction zone, in which the liquid L is treated, consists of 6 mixers and 6 settlers, it may be that 6 solvent cycles are employed; it is, however, also possible to use a smaller number of cycles, viz., 4, 3 or 2.

When using 6 solvent cycles the raffinate phases of the mixtures L and H, which phases are poor in solvent, after separation in the two settlers used for the purpose, are removed therefrom and conducted to the mixers of another cycle. In the last mentioned embodiment with 6 cycles each cycle in which a solvent circulates consists of: a mixer + settler + mixer + settler.

In the process according to the present invention use may be made of the countercurrent principle; further the process may be carried out continuously or intermittently. It may be carried out in any apparatus known for the extraction of liquids. Thus, one may, for example, make use of series of mixers and settlers, or of countercurrent columns. Instead of settlers, centrifuges may also be employed. As mixers one may use, for instance, centrifugal pumps, ejectors or vessels with propellers.

The process may be applied to all types of liquid mixtures, which should satisfy the requirement that each of these mixtures can be treated with the same selective solvent.

Examples of liquid mixtures are, for instance:

hydrocarbon oils the boiling range of which do not overlap, such as kerosene, spindle oil and heavy lubricating oil. As extracting agent there may be used a selective solvent of the type of liquid $SO_2$; a few of them are: furfural, cresylic acid, BB' dichloroethyl ether, quinoline, phenol, and nitrobenzene.

A mixture of organic chlorine compounds and a mixture of corresponding alcohols can also be split up, for instance with the aid of a polyvalent alcohol.

It is also possible to separate nitrogen bases from various hydrocarbon oils with the aid of phenol, to separate, after oxidation of various paraffin fractions, the oxidation products from the non-oxidized paraffin wax with the aid of alcohol, and to separate chlorine compounds from fractions containing the latter and the corresponding olefines with the aid of ethyl alcohol.

Chlorine compounds can be separated from the corresponding alcohols with the aid of water or polyvalent alcohols. With the same solvents alcohols can likewise be separated from the corresponding olefines.

Mono-ethanol amine may be used for separating fatty acids from the alcohols prepared therefrom by reduction.

Another example is the separation of a mixture of a higher alcohol and a phenol, which may be separated with the aid of water. Numerous other examples are given in the patent of Van Dijck and Mayer, No. 2,081,721. (Vide also British Patent No. 424,867.)

The process according to the invention may also be applied when splitting up the raffinate and/or extract components prepared during a previous application of the process according to the invention.

The details of the process, and the requirements relative to the separability of the components of the mixtures outside of the process, are more fully disclosed in connection with the accompanying drawings, in which Figures 1, 2 and 3 are schematic flow diagrams illustrating alternative modes of applying the present invention.

Referring to Figure 1, the letters A and B represent countercurrent extraction apparatus, which may, for example, comprise packed towers suitable for countercurrent flow of liquids of different specific gravities, or of a series of mixing and settling devices. The latter type of apparatus is schematically indicated on the drawings, in which a plurality of partitions are provided in each of the columns A and B to provide mixing chambers 1 to 9 and 11 to 19, inclusive, each connected by means of an orifice to settling chambers 21 to 29 and 31 to 39, inclusive. The settling chambers are provided with vertically spaced outlets at points remote from the mixing chamber, through which the stratified raffinate and extract phases are withdrawn from the mixing zones, and introduced into the adjacent mixing chambers, or removed from the apparatus, as subsequently described. The mixing chambers may be provided with stirring devices, and pipe conduits, pumps, valves, heat exchangers, and other auxiliary equipment, not shown, may be provided to induce the desired countercurrent flow, and, if desired, a temperature gradient. When a temperature gradient is employed, ends of the columns near the points of withdrawal of the raffinate phases (i. e., the upper ends, when the selective solvent is heavier than the raffinate phase) are warmer than the other ends.

Each apparatus A and B is shown to comprise three zones, viz., a scrubbing zone consisting of the upper three stages (mixers 1 to 3 and 11 to 13, and phase separators 21 to 23 and 31 to 33); an extraction zone, consisting of the three middle stages; and a washing zone, consisting of the lowermost three stages. The mixture L to be extracted is continuously fed into the mixer 6 through a conduit 6a and mixed with the phase poor in solvent, i. e., the raffinate phase, from the separator 27, and with the solvent rich or extract phase from the separator 25. The resulting mixture is fed into the separator 26, where it separates into raffinate and extract phases, these phases being fed into the mixers 5 and 7, respectively. Initially, selective solvent from the tank 10 may be fed into the mixer 1 through a valve 20 to cause countercurrent flow through the several stages of the scrubbing and extraction sections, the valve 20 being preferably shut after the unit is in operation and a solution of S+HE is introduced into the mixer 1 via the conduit 30.

The extract phase introduced into the mixer 7 is washed in the washing zone in countercurrent with a washing liquid containing the component LE in a greater concentration than its concentration in the ultimate extract phase withdrawn from the column A and is capable of forming two liquid phases therewith, and is most easily produced from the extract phase itself, as described below; it may, however, also be obtained apart from the process. This washing liquid is introduced into the mixer 9 through a conduit 40 and valve 41.

In the normal operation of the process the liquid L, together with the raffinate phase from the separator 27, is extracted in countercurrent in the extraction zone with a solution of S+HE which has been freed from HE for the greater part in the scrubbing zone. The solvent chiefly dissolves LE in the extraction zone, so that in the last stage (24) of the extraction zone the liquid L is largely stripped of the component LE and consists predominantly of LR. The relatively small quantity of HE still present in the extract phase flowed from the separator 23 to the mixer 4, passes from the solvent phase to the LR or raffinate phase in the stages of the extraction zone. As a result of the operations in the extraction zone a solution of LR + some HE + a small amount of S is produced as the raffinate in the separator 24, which is flowed into the mixer 3.

A liquid consisting entirely or largely of LR or of LR+S is introduced into the mixer 3 through the conduit 42, together with the raffinate phase from the separator 24, and the resulting mixture is flowed in the scrubbing zone countercurrently to the extract solution from the apparatus B, which consists substantially of S+HE, and is introduced into the mixer 1. The said resulting mixture removes the greater part of HE from the said extract consisting of S+HE before the latter is flowed from the separator 23 to the mixer 4 and is employed as the extracting agent in the extraction zone. After having been treated in countercurrent with S+HE in the scrubbing zone, the phase poor in solvent (i. e., the raffinate phase) consists of LR+HE+some S. This raffinate phase is withdrawn from the separator 21 through a conduit 43 and treated in separating apparatus which may, for example, consist of a single fractionating column, or, as shown, of a pair of distilling units 44 and 45, each of which may be operated to isolate one component. Thus, HE may be withdrawn at 46 as the bottom product of the unit 44, and the top product from the unit 44 may be further distilled in the unit 45 to yield LR at 47 and the solvent S at 48, the latter being returned to the solvent tank 10.

A portion of LR may be returned to the conduit 42 through a valve 49, together with selective solvent admitted from the tank 10 through a valve 50, to compensate for the solvent withdrawn from the system with the raffinate phases. If desired, the selective solvent may be introduced apart from the recycled raffinate in the conduit 42, as, for example, by introduction into the mixer 1, 2 or 4. It is often more economical to close the valve 49 and take off the recycle stock for the mixer 3 through a valve 51.

The apparatus B is operated in an analogous manner, the mixture H being introduced into the mixer 16 through a conduit 16a, and the final extract phase, consisting of S+LE, removed from the separator 29, is employed as the extracting agent by introduction into the mixer 11 through a conduit 52. This extracting agent is scrubbed in the scrubbing zone by countercurrent flow with raffinate from the extraction zone and with a stream of a liquid rich in HR, introduced into the mixer 13 through the conduit 53. Additional selective solvent, to compenate for the solvent removed from the raffinate phase may be introduced into the mixer 13 through a valve 54, or into any other mixer, as through a valve 55, although it is preferable to replenish the solvent by introduction at a stage below the upper stage. Moreover, it is not necessary to replenish the solvent by introduction into both of the apparatus A and B, since solvent introduced into either unit will be carried into the other unit.

The raffinate phase withdrawn from the separator 31 at 56 is separated in the units 57 and 58, which may be similar to the units 44 and 45, to produce HR at 59, LE at 60 and S at 61, a part of HR being returned through the valve 62 and conduit 53, as described above. The washing liquid for the apparatus B is introduced into the mixer 19 through the valve 63 and conduit 64, but may be obtained from an extraneous source; it contains HE in a higher concentration than the extract phase in the unit B.

The conduits carrying the washing and scrubbing liquids may be provided with heat exchangers 65, 66, 67 and 68 for chilling and/or heating the liquids.

As was pointed out above, the above described process may be modified by eliminating the washing zones (consisting of the three lowermost sections of each unit) from one or both of the units, the extract phase from the separator 26 being fed directly into the mixer 11, and the extract phase from the separator 36 being fed directly into the mixer 1.

Figure 2 illustrates a process in which the features of the U. S. Patents Nos. 2,023,109, 2,081,720 and 2,081,719 are applied. In this figure, 70 and 71 are countercurrent extraction units, such as packed towers, or apparatus of the type shown in Figure 1, provided with temperature regulating devices, such as coils 72, 73; 74, 75, 76 and 77 are separating units, corresponding to units 44, 45, 57 and 58 of Figure 1; 78 is a source for the selective solvent S, and 79 is a source for an auxiliary solvent P which dissolves the component of the initial liquid mixtures L and/or H which is not preferentially dissolved in the solvent S, and which is at least partially immiscible with the solvent S in the presence of the extraction mixture under the extracting conditions.

The mixtures L and H to be extracted are introduced into the columns 70 and 71 at intermediate points thereof through conduits 80 and 81. At the beginning of the process the solvent S is introduced into the column 70 at the top through a valve 82 and removes the component LE from the mixture L, so that a solution of S+LE leaves the column at 83. Because the other component of the mixture L, i.e., LR, as a rule also dissolves in the solvent S, although to a lesser extent, a solution of S+LE contaminated with LR would flow off from the column at the bottom if no special precautions were taken. The component LR which during the extraction has collected in the extract solution S+LE in the upper half of column 70 is removed therefrom again in the lower half of the column by a washing with a washing liquor consisting of LE or containing LE in a higher concentration than the said extract solution; this washing liquor is introduced at the bottom of the column at 84. By a proper control of the temperatures in the three different zones of the extraction apparatus, as has been described in the U. S. Patent No. 2,081,720, a two-phase system is maintained throughout the column. Moreover, the temperature can be so controlled as to keep the quantity of one of the phases, while flowing through a part or the whole of the apparatus, constant, except for the discontinuity occurring at the places of entrance or discharge.

The temperatures can also be controlled in such a manner as to ensure a constant concentration of the constituents dissolved in the solvent in any part of the apparatus.

From the bottom of the column there flows upwards a mixture of the washing agent LE and the washed component LR. This mixture is constantly growing richer in LR. The composition will at some point be such that the ratio LR:LE prevailing therein is equal to the corresponding ratio in the mixture L, and it is desirable to introduce the mixture L to be extracted into the column at this point. The solution S+LE flowing off from column 70 at 83 serves as extracting agent for the mixture H in the column 71.

The mixture H is extracted with the aid of two liquids P and S which are either immiscible or slightly miscible, led in countercurrent to each other, in which the components of the mixture H are distributed in different proportions (cf. U. S. Patent No. 2,023,109).

The extracting agent P is introduced at the bottom of the column 71 at 85 at a rate controlled by a valve 86; and the extract from the column 70, consisting of LE+S, is introduced at 87. The latter material is stripped of the component LE in the upper portion of the column with the aid of a quantity of a scrubbing liquid consisting of HR or containing HR in a high concentration, introduced at 88 through a valve 89. The column 71, therefore, consists of three zones: the scrubbing zone, extending from the top of the column to the inlet 88, the extraction zone, extending from the inlet 88 to the feed inlet 81; and the washing zone below the inlet 81.

As explained above for Figure 1, the material flowing downwardly from the scrubbing zone into the extraction zone has been freed, for the greater part, of LE, and consists mainly of S, together wtih small quantities of HR which are dissolved therein, and even lesser quantities of LE and HE. For an understanding of the present process it is, however, sufficient to consider the liquid flowing downwardly past the inlet 88 as consisting of S alone, and the extraction proper of the mixture H then takes place between the inlets 81 and 88, the component HE being thereby dissolved in the solvent and carried down into the washing zone as the extract phase, together with certain amounts of HR dissolved therein, it being the function of the washing zone to remove HR as far as possible or desirable from the said extract solution. What little LE may have been carried down from the scrubbing zone is, for the most part, washed out by the raffinate phase in the extraction zone, and reintroduced into the scrubbing zone together with it.

The extract phase flowing downwardly past the the inlet 81 is washed in the washing zone with the liquid P, to produce an ultimate extract phase which is withdrawn at 90, and consists mainly of HE+S (together with minor amounts of P, depending upon the degree of miscibility of S and P), which is introduced into the column 70 at 91, for extracting the liquid L. If undesirably large quantities of P are present in this extract phase, P may be removed therefrom before introduction into the column 70. This may, for example, be effected by simply reducing the pressure, it being usual to employ a normally gaseous hydrocarbon, such as ethane, propane, butane, or their mixtures, as the liquid P, when extracting hydrocarbon mixtures, although the present invention is in no way restricted to these substances. When such a volatile liquid is employed, its separation from the extract phase is a simple matter and does not involve the application of heat for distillation.

Returning now to the column 70, this column likewise consists of: a scrubbing zone, extending from the top of the column to an inlet 92 for the introduction of a scrubbing liquid; an extraction zone, extending from the inlet 92 to the inlet 80; and a washing zone extending from the inlet 80 to the bottom of the column. In the scrubbing zone the extract phase, introduced at 91, is stripped for the greater part of the dissolved component HE, which is effected by countercurrent contact with a scrubbing liquid consisting of, or containing a high concentration of, LR, introduced through a valve 93 and the inlet 92. In the extraction zone the solvent S selectively dissolves LE from the initial solution L, as described above, to produce an extract phase consisting mainly of LE+S, but containing also LR. This extract phase flows downwardly past the inlet 80 into the washing zone in which it is stripped of the component LR, as described above, by means of LE introduced at 84.

The raffinates withdrawn from the tops of the columns at 94 and 95 are treated in the separating units 74—77. The raffinate phase flowing off at the top of column 70 consists of LR+HE+some S, these components being obtained at 96, 97 and 98, respectively, a part of LR being recycled at 92 as described above. The most effective points in the columns for introducing the solvent S after the column is in operation are those at which the prevailing concentration of the dissolved components in the solvent is the lowest. In general, this will occur approximately on the boundary between the extraction and the scrubbing zone, in view of the fact that in the scrubbing zone the solvent has already been stripped of the greater part of one extract, whilst the dissolution of another extract begins in the extraction zone. It is, therefore, advantageous to introduce the regenerated solvent at a point near the inlet 92, as, for example, at 99, through a valve 100. (Vide also the valves 50 and 54 and the inlets 42 and 52 in Figure 1; and the inlets 134 and 147 in Figure 3.) The valve 82 would, of course, be closed after the process is in normal operation. While the introduction of the regenerated selective solvent at 91 is not so desirable because it tends to reduce the concentration of HE in the raffinate phase withdrawn at 94, it is permissible to introduce it at any desired point.

The raffinate phase withdrawn from the column 71 at 95 consists primarily of P+HR+LE, but may contain small amounts of S, depending upon the degree of miscibility of P and S. HR, LE and P are obtained at 101, 102 and 103, respectively, the material in the conduit 103 containing such quantities of S as may be present in the raffinate. If desired, this may be separated by an additional distilling unit and returned to the tank 78, although the amount of S in the liquid P which is introduced at 85 is generally so small as not to affect the operation materially. A part of HR is returned to the column 71 at 88, and a part of LE is returned to the column 70 through a valve 104 and the inlet 84.

If desired, the coils 73 in the column 71 may be employed in a manner similar to the coils 72 in the column 70 to maintain the upper part of the column at a higher temperature than the lower part, although the use of a temperature gradient is not essential when employing an auxiliary solvent P.

It should also be noted that it is not necessary to introduce the liquids L and H at approximately the median points of the columns, but that any point may be selected. Thus, the liquid L could be introduced at 84, (thereby eliminating the washing zone), whilst the flow of the washing liquid may or may not be discontinued; and/or the liquid H may be introduced at 85, together with the liquid P, e. g., dissolved in it or without it.

Figure 3 illustrates the application of the present invention to two multiple-connected extraction systems, comprising countercurrent extraction columns. Each of the columns may, if desired, be replaced by one or more mixers and settlers of the type shown in Figure 1.

In Figure 3, 110, 111 and 112 are three extraction columns or contact units of the first extraction system for continuously extracting a liquid L in countercurrent with the aid of three streams of solvent flowing in separate cycles. 113, 114 and 115 are the similar extraction columns or contact units of the second extraction system for continuously extracting a liquid H.

The first extraction system comprises a scrubbing zone, consisting of the column 110, and an extraction zone, consisting of the columns 111 and 112; in the second extraction system, the column 115 is the scrubbing zone, and the columns 113 and 114 the extraction zones. Column 112 is the introduction unit of the first extraction system and column 110 is the last unit thereof; similarly, column 113 is the introduction unit of the second extraction system and column 115 is the last unit thereof.

The first cycle consists of the column 113, the conduit 116, the column 110, and the conduit 117.

The second cycle consists of the column 114, the conduit 118, the column 11, and the conduit 119.

The third cycle consists of the column 115, the conduit 120, the column 112 and the conduit 121.

Suitable pumps, gauges, heat exchangers, and other auxiliary equipment, not shown, may be provided by persons skilled in the art. The extraction columns are interconnected as shown on the diagram, it being assumed that the phase rich in solvent, i. e., the extract phase, is heavier than the solvent-poor or raffinate phase. In each column, the extract phase is withdrawn at the bottom, and the raffinate phase is withdrawn at the top.

The liquid L is fed into column 112 at 122 and extracted in counter-current with a solution substantially consisting of HE and S and introduced via 120. This solution extracts a part of the component LE from L and gives off HE to the remaining liquid. The extract phase leaves column 112 via 121 and is used as the extracting agent for the extraction of a raffinate phase from the liquid H, which is fed into the column 115 by a conduit 123; the extracting agent, consisting of S+LE, gives off LE and takes up HE. The mixture H, which has already lost a great part of its soluble components HE in the columns 113 and 114, loses the remaining parts thereof in the column 115, and as LE has been taken up during the process, a liquid consisting of S+HR+LE leaves column 115 through the conduit 124 as a raffinate phase. The said raffinate phase is split up by any known manner, such as distillation, in the apparatus 125 and 126, HR and LE being obtained at 127 and 128, respectively. In order to render the giving off of LE which, dissolved in S, has been fed into the column 115 via 121 as intensive as possible, use is made of a scrubbing liquid rich in HR. The concentration of HR in the scrubbing liquid flowing through the column 115 is raised by adding HR to said liquid, which may be done by introducing HR via the conduit 129 and/or 130 and valve 131 and/or 132. Thus it may be ensured that the liquid returning via 120 to column 112 is stripped of LE as much as possible.

In order to keep the quantity of S in the system constant the regenerated quantity of S obtained at 133 is returned to the process at 134 or to the conduit 123, approximately on the boundary between the extraction and the scrubbing zone.

In the first solvent cycle, H is introduced at 135 and the greater part of the component HE is dissolved in S in column 113 and conducted via the conduit 116 to column 110. In the latter column it is stripped of HE with the aid of a scrubbing liquid of which the LR concentration has been increased. The liquid of which the LR concentration has been increased is produced by returning part of the component LR obtained at 136 from the separating units 137 and 138 via the conduits 139 and/or 140 and the valves 141 and/or 142 into the process. If some LE is still present in the liquid entering column 110 via the conduit 143, it is extracted therefrom and leaves column 110 via the conduit 117 as S+LE. If the scrubbing in column 110 has not been complete, the solution of S+LE contains in addition some HE, which returns into column 113 in this way via 117.

The phase poor in S flowing off from column 110 through the conduit 144 chiefly consists of LR and HE, together with some S. It is split up into its components in the apparatus 137 and 138 in some known manner, e. g., by distillation, HE and LR being obtained at 145 and 136, respectively, and S at 146, which may be returned to the process at 147.

The multiple-connected extraction system outlined in Fig. 3 is applied advantageously if the component LE or HE to be removed really consists of two components $LE_1$ and $LE_2$ or $HE_1$ and $HE_2$ with a different (progressively decreasing) solubility in S. $LE_1$ is then removed in column 112, the less soluble component $LE_2$ in column 111, a saving of the solvent S being thus effected.

With the multiple-connected systems it is possible to carry out the extraction and/or scrubbing and/or washing in such a manner that the phase rich in solvent and the one poor in solvent, which are contacted in each of the columns or in a series of mixers and settlers, are in direct current, i. e., flow in the same direction. In the latter case, however, the liquid mixtures subjected to extraction should be in counter-current to each other. In Figure 3, therefore, the direction in which the phases rich in solvent flow through the conduits 116, 118, 120 and 117, 119, 121 may be reversed, but the places of entrance of L and H cannot be altered in the sense that both L and H may be fed into the series of columns either at the top or at the bottom of the series.

As used in the present specification and claims, the term "component" is used to designate either of the two or more portions of any liquid mixture which are differently soluble in the selective solvent. It will be evident that by the word "component" is meant not only one chemically pure substance, but this word also covers a mixture of substances. The word "liquid mixture" is generic to homogeneous liquid solutions and to liquid emulsions.

We claim as our invention:

1. A process for the extraction of a plurality of at least two different initial liquid mixtures containing different components, each mixture containing a component which is preferentially soluble in a selective solvent and a component which is not preferentially soluble therein, comprising the steps of subjecting the first of said initial mixtures to the extractive action of said selective solvent in a first extraction stage to produce a first raffinate phase containing the component of the first mixture which is not preferentially soluble and a first extract phase containing the solvent and the preferentially soluble component of the first mixture, separating said first phases, introducing the first extract phase and a second of said initial mixtures at spaced points of a second counter-current extraction stage, contacting the second mixture in the second extraction stage counter-currently with the first extract phase to form therein a second raffinate phase containing the preferentially soluble component of the first mixture and the component of the second mixture which is not preferentially soluble, and a second extract phase containing the selective solvent and the preferentially soluble component of the second mixture, separately withdrawing the second raffinate and extract phases from the second extraction stage, and introducing into said second extraction stage, at a point intermediate the points of introduction of said first extract phase and said second initial mixture, a scrubbing liquid containing the component of said second mixture which is not preferentially soluble in a higher concentration than said second initial mixture.

2. The process according to claim 1 in which the scrubbing liquid is introduced into the second extraction stage at a point at which the preferentially soluble component of the second mixture has been substantially extracted from the second mixture.

3. The process according to claim 1 in which the first extraction stage is a countercurrent extraction stage, the second extract phase is introduced into the first extraction stage at a point spaced from the point of introduction of the first mixture and is therein flowed countercurrently to the first liquid mixture to cause the first raffinate phase to contain the preferentially soluble component of the second mixture together with the component of the first mixture which is not preferentially soluble.

4. The process according to claim 1 in which the first extraction stage is a countercurrent extraction stage, the second extract phase is introduced into the first extraction stage at a point spaced from the point of introduction of the first mixture and is therein flowed countercurrently to the first liquid mixture to cause the first raffinate phase to contain the preferentially soluble component of the second mixture together with the component of the first mixture which is not preferentially soluble, and a scrubbing liquid containing the component of the first mixture which is not preferentially soluble in a higher concentration than said second initial mixture is introduced into said first extraction stage at a point intermediate the points of introduction of said first initial mixture and the second extract phase.

5. The process according to claim 1 in which fresh selective solvent is introduced into the second extraction stage at a point intermediate to the points of introduction of said first extract phase and said second initial liquid mixture.

6. The process according to claim 1 in which fresh selective solvent is introduced into the second extraction stage at a point intermediate to the points of introduction of said first extract phase and said second initial liquid mixture, said intermediate point being the point where the solvent present in the second extraction stage contains a minimum of dissolved material.

7. The process according to claim 1 in which the first and second initial mixtures are hydrocarbon oils having different, non-overlapping boiling ranges.

8. A process for the extraction of a plurality of at least two different initial liquid mixtures containing different components, each mixture containing a component which is preferentially soluble in a selective solvent and a component which is not preferentially soluble therein, the preferentially soluble component of the first mixture being separable by physical means from the component of the second mixture which is not preferentially soluble, comprising the steps of subjecting the first initial mixture to the extractive action of said selective solvent in a first extraction stage to produce a first raffinate phase containing the component of the first mixture which is not preferentially soluble and a first extract phase containing the solvent and the preferentially soluble component of the first mixture, separating said first phases, introducing the first extract phase and the second initial mixture at spaced points of a second countercurrent extraction stage, contacting the second mixture in the second extraction stage countercurrently with the first extract phase to form therein a second raffinate phase containing the preferentially soluble component of the first mixture and the component of the second mixture which is not preferentially soluble, and a second extract phase containing the selective solvent and the preferentially soluble component of the second mixture, separately withdrawing the second raffinate and extract phases from the second extraction stage, treating the withdrawn second raffinate phase by physical means to recover a scrubbing liquid containing the component of the second mixture which is not preferentially soluble in a higher concentration than said second initial mixture, and introducing said scrubbing liquid into said second extraction zone at a point intermediate the points of introduction of said first extract phase and said second initial mixture.

9. The process according to claim 8 in which the first and second liquid mixtures have different, non-overlapping boiling ranges, and the scrubbing liquid is recovered by distilling the second raffinate phase.

10. A process for the extraction of a plurality of at least two different initial liquid mixtures having different, non-overlapping boiling ranges, each mixture containing a component which is preferentially soluble in a selective solvent and a component which is not preferentially soluble therein, comprising the steps of introducing each of said mixtures into a separate countercurrent extraction stage forming a part of a closed circuit of a plurality of extraction stages, introducing into each extraction stage, at a point spaced from the point of introduction of the initial mixture, an extracting agent containing said selective solvent and dissolved therein preferentially soluble component derived from the mixture introduced into the preceding extraction stage of the circuit, countercurrently contacting the introduced mixture and extracting agent in each extraction stage to form therein an extract phase containing said selective solvent and the preferentially soluble component of the mixture introduced into the respective extraction stage, and a raffinate phase containing the component of the mixture introduced into said respective extraction stage which is not preferentially soluble in the selective solvent and the preferentially soluble component of the mixture introduced into the next preceding extraction stage of the circuit and which preferentially soluble component was dissolved in the extracting agent introduced into said respective extraction stage, separately withdrawing the extract and raffinate phases from the extraction stage, using the extract phase withdrawn from each extraction zone as the extracting agent in the next succeeding extraction zone of the circuit, distilling each withdrawn raffinate phase to separate the preferentially soluble component contained therein from the component which is not preferentially soluble and is also contained therein, and introducing as a scrubbing liquid into at least one of the extraction stages, at a point intermediate the points of introduction of the initial mixture and the extraction agent, a portion of the component which is not preferentially soluble and which was separated by distillation from the raffinate withdrawn from the respective stage.

11. A process for the extraction of a plurality of at least two different initial liquid mixtures containing different components, each mixture containing a component which is preferentially soluble in a selective solvent and a component which is not preferentially soluble therein, comprising the steps of subjecting a first of said initial mixtures to the extractive action of said selective solvent in a first extraction stage to produce a first raffinate phase containing the component of the first mixture which is not preferentially soluble and a first extract phase containing the solvent and the preferentially soluble component of the first mixture, separating said first phases, introducing a second of said initial mixtures at an intermediate point of a second countercurrent extraction stage, introducing said first extract phase into the second extraction stage at a point spaced from said intermediate point, flowing said second mixture countercurrently to said first extract phase in the second extraction stage to form therein a second raffinate phase containing the preferentially soluble component of the first mixture and the component of the second mixture which is not preferentially soluble, and a second extract phase containing the selective solvent and the preferentially soluble component of the second mixture, introducing into the second extraction stage, at a point spaced from said intermediate point in the direction of flow of the extract phase, a washing liquid capable, under the conditions of the process, of forming two liquid phases with said second extract phase and improving the composition of the extract phase, contacting said second extract phase and the washing liquid between the points of introduction of the washing liquid and said intermediate point, thereby forming an improved final second extract phase, separately withdrawing the second raffinate phase and the final second extract phase from the second extraction stage at spaced points thereof, and introducing into said second extraction stage, at a point intermediate the points of introduction of said first extract and said second initial mixture, a scrubbing liquid containing the component of said second mixture which is not preferentially soluble in a higher concentration than said second initial mixture.

12. The process according to claim 11 in which the preferentially soluble component of the first mixture has a boiling point wihch is different from that of the component of the second mixture which is not preferentially soluble, the second raffinate is distilled to recover the component of the second mixture which is not preferentially soluble substantially free from the preferentially soluble component of the first mixture, and a portion of the resulting recovered product is used as the scrubbing liquid.

13. A process for the extraction of two different initial liquid mixtures containing different components, each mixture containing a component which is preferentially soluble in a selective solvent and a component which is not preferentially soluble therein, comprising the steps of introducing each of said mixtures into a separate extraction system comprising a series of liquid contact units at an introduction unit other than the last units of the systems, introducing an extracting agent containing said selective solvent into each unit of each extraction system, contacting the introduced mixture and the extracting agent in each of said introduction units to form an extract phase containing the selective solvent and the preferentially soluble component of the mixture introduced into the respective introduction units and a raffinate phase containing the component of the mixture introduced into the respective introduction unit which is not preferentially soluble in the selective solvent, withdrawing a raffinate phase from each extraction unit and introducing each withdrawn raffinate phase except that withdrawn from the last extraction unit of each system into the next succeeding unit of the same extraction system, contacting the introduced raffinate phase and the extracting agent in each unit other than said introduction units to form therein an extract phase containing the selective solvent and a raffinate phase containing the component of the mixture introduced into extraction system containing the respective unit which is not preferentially soluble, the raffinate phase from the last unit of each extraction system containing the preferentially soluble component of the mixture introduced into the other extraction system, withdrawing the extract phase from each extraction unit and using it as the extracting agent in the extraction unit of the other extraction system which is removed by approximately as many units from the introduction unit of its extraction system as the unit from which the respective extract phase was withdrawn is removed from the last unit of its extraction system and introducing into at least one extraction system, at a point intermediate the point of introduction of the initial mixture into the introduction unit and the point at which the raffinate is withdrawn from the last unit, a scrubbing liquid containing the component of the mixture introduced into said respective extraction system which is not preferentially soluble in a higher concentration than said last named mixture.

14. The process according to claim 13 in which a scrubbing liquid is introduced into each extraction system.

15. The process according to claim 13 in which the first and second liquid mixtures have different, non-overlapping boiling ranges, and the scrubbing liquid is recovered by distilling the raffinate phase which is withdrawn from the extraction system into which the scrubbing liquid is introduced.

16. The process according to claim 13 in which each liquid contact unit is a countercurrent unit arranged to effect the countercurrent flow of the extracting agent with the material contacted therewith.

WILLEM J. D. VAN DIJCK.
ALBERT SCHAAFSMA.